United States Patent [19]
Jimena

[11] Patent Number: 5,905,359
[45] Date of Patent: May 18, 1999

[54] COMBINATION FLYWHEEL AND ELECTRICAL STORAGE CELL AND METHOD OF USE

[76] Inventor: Carl L. Jimena, 3221 National City Blvd., #64, National City, Calif. 91950

[21] Appl. No.: 09/021,496

[22] Filed: Feb. 10, 1998

[51] Int. Cl.⁶ .................................................. H01M 10/46
[52] U.S. Cl. ............................................................. 320/114
[58] Field of Search ..................... 320/101, 107, 320/112, 114, FOR 101, FOR 104, FOR 160; 362/159, 176, 177, 192; 290/1 R, 50, 54; 322/2 R, 3, 4

*Primary Examiner*—Edward H. Tso
*Attorney, Agent, or Firm*—Henri J.A. Charmasson; John D. Buchaca

[57] ABSTRACT

A portable, light-weight, electrically powered device that derives at least part of its power from manual mechanical input means having a rotatively mounted battery which provides electrical power but also acts as an mechanical inertial storage mechanism. The kinetic energy of the moving battery is capable of being utilized via a generator to energize the device's electrically powered element. In one embodiment, a compact high-output generator is disclosed for providing increased current over a given time period for recharging the battery. In another embodiment a rotatively mounted canister is provided for mounting one or more batteries or other variable mass materials if generator power is used exclusively. Manual input occurs via enclosed gear-based hand levers.

19 Claims, 4 Drawing Sheets

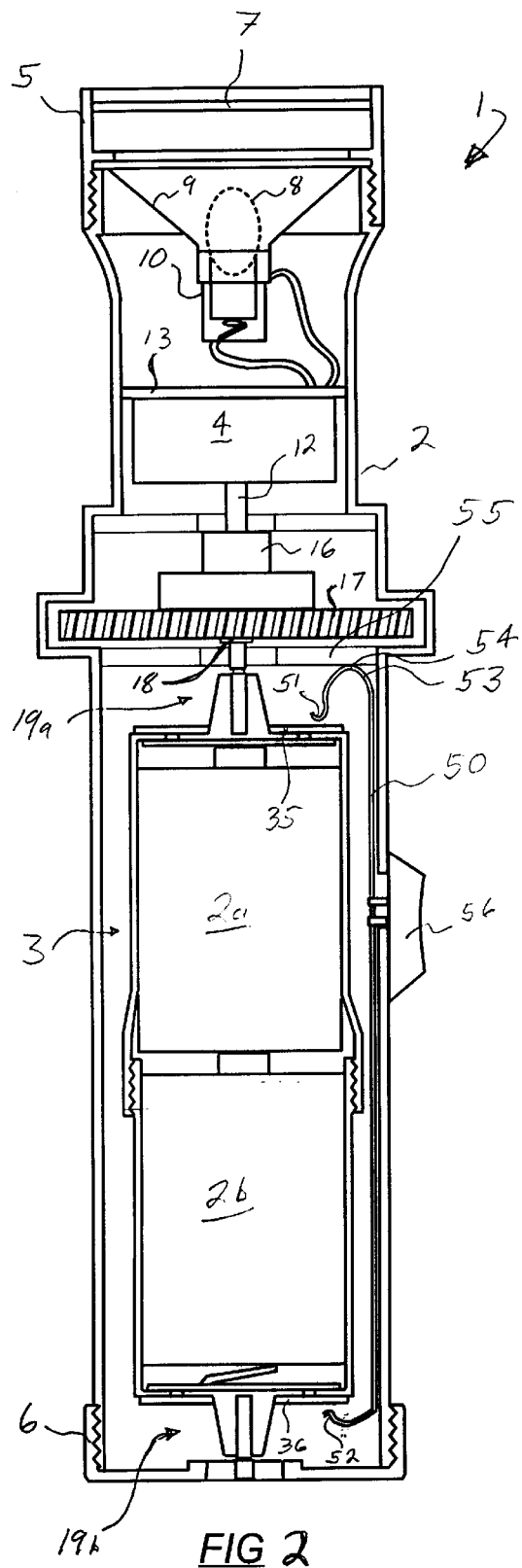

COMBINATION FLYWHEEL AND ELECTRICAL STORAGE CELL AND METHOD OF USE

FIELD OF THE INVENTION

This invention relates to portable powered consumer items and more particularly to manually powered electrical consumer items such as hand-powered flashlights.

BACKGROUND OF THE INVENTION

Portable battery powered electrical devices such as radios, telephones and flashlights are well known. It is also well known to electrically power such devices using generators which convert manually input mechanical energy into the electrical energy used by the device. Speck, U.S. Pat. No. 3,099,402 shows that a battery can be included as an alternate source of electrical power and that the generator current can serve to recharge the battery as well as power the bulb of a flashlight.

Manual input may be either direct as in the case of McNath, U.S. Pat. No. 2,424,700, or indirect through storage in a spring as shown in Speck, allowing extended operation with only periodic winding of the spring. Spring based storage suffers primarily from higher manufacturing costs, limited storage capacity, wear and eventual breakdown of the spring over repeated operation cycles, the potential for overwinding, and a bulkier housing capable of containing the spring in both wound and unwound states.

It has been shown by Jimena, U.S. Pat. No. 4,315,301 that instead of a spring, a high inertia flywheel may be used to store manually input mechanical energy. The spinning flywheel also provides a gyroscopic effect which helps to stabilize the flashlight orientation during manual input.

However, flywheel based storage suffers from both bulkiness and weight. The kinetic energy stored in a rotating body is increased by increasing its mass or by locating its mass at a greater distance from the body's axis of rotation. Therefore, for greater energy storage, the flywheel should be large or massive or both. However, neither of these two design criteria are desirable in a portable devices. Therefore, most designs strike a compromise between portability and energy storage. In addition, flywheels are costly in both material and fabrication since both dense and durable materials such as metals like iron or steel are preferred.

Various manual input means such as disclosed in Speck and Jimena have mechanisms which may subject the user's hands to pinching between the levers and flashlight body and/or the gearing.

With respect to the battery recharging ability of manually activated generators, it is desirable to recharge as quickly as possible. This is furthered by a well regulated, efficiently supplied high voltage to the battery. Current manually operated generators suffer from relatively low output over a given time period.

It is therefore desirable to have a portable handheld electric device which is at least partially manually powered and which reduces the above identified problems.

SUMMARY OF THE INVENTION

The principal and secondary objects of the invention are to provide an economical, simple to manufacture, portable, light-weight, electrically powered device that derives at least part of its power from manual mechanical input means.

It is another object of the invention to provide a manually powered device which has more efficient and comfortably operated manual input means.

It is another object of this invention to provide a higher output generator for recharging the battery in a partially manually powered device.

These and other objects are achieved by a battery operated device in which a rotatively mounted battery provides electrical power but also acts as an mechanical inertial storage mechanism. The kinetic energy of the moving battery is capable of being utilized via a generator to energize the device's electrically powered element. In one embodiment, a compact high-output generator is disclosed for providing increased current over a given time period for recharging the battery. In another embodiment a rotatively mounted canister is provided for mounting one or more batteries or other high mass material if generator power is used exclusively. Manual input occurs via enclosed gear-based hand levers.

BRIEF DESCRIPTION OF THE DRAWINGS

FIG. 2 is a diagrammatic, cross-sectional side view of a flashlight according to the invention;

FIG. 3 is a diagrammatic, cross-sectional side view of the battery canister and rotative couplings to the flashlight housing;

DESCRIPTION OF THE PREFERRED EMBODIMENT OF THE INVENTION

Figure 1:
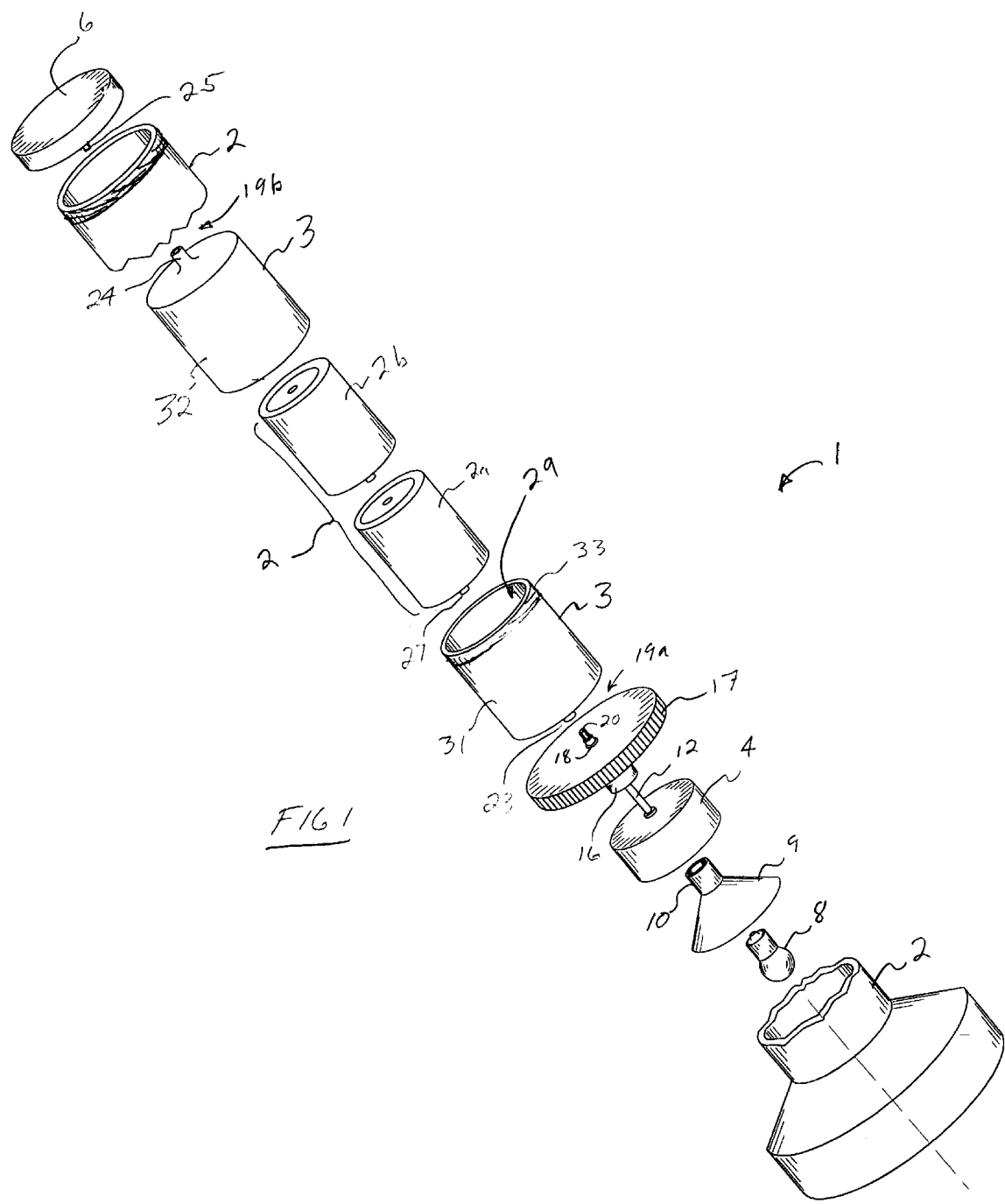
FIG. 1 is a diagrammatic exploded perspective view of a flashlight according to the invention.

Referring now to the drawing, there is shown in FIGS. 1–2, a portable flashlight 1 which can be powered either by battery 2 or through a manually operated electrical generator 4. The generator is driven by the flywheel effect of a spinning battery canister 3a,3b dynamically mounted within the flashlight housing 2. The term "dynamic mounting" means that the battery may move with respect to the housing. The battery canister is set in motion through any of a variety of manual input means. The term "flywhee" is meant to be a substantially axially symmetric mechanical construct of enough mass to operate as an inertial kinetic energy storage device when rotating.

The flashlight 1 comprises a generally oblong cylindrical housing 2 having first and second ends 5,6. The first end 5 comprises an open or otherwise transparently fronted cap 7 for mounting a bulb 8 within a reflector 9. The reflector comprises a socket 10 for mounting the bulb and a pair of electrical contacts leading from the poles of the bulb to wires 11 connecting to the output terminals of the generator 4. Other wiring (not shown) runs along the inner surface of the housing to connect the generator to the thumb switch 56 and batteries 2a,2b. Additional circuitry may be conveniently placed on the forward facing surface of a front bulkhead 13.

The generator 4 can of the type commonly available on the market having a rotatable input drive shaft 12 which outputs about 1.5 volts AC at a frequency dependent on the input RPM. This AC output can be used directly to drive the light bulb, or regulated to either drive the light bulb or recharge the battery. The preferred generator is efficient, durable, small and lightweight. For battery recharge capability, a high output generator is preferred. An embodiment of a higher output generator is described later.

The generator is secured within the housing 2 to the rearward facing surface of the front bulkhead 13. The input drive shaft 12 extends rearward from the generator to connect to a slip clutch assembly 16 and on to a coupling 19a with the battery canister 3. A drive pinion gear 17 is rotatively mounted onto the drive shaft. The slip clutch temporarily couples the pinion to the drive shaft during manual actuation. When the pinion 17 is at rest, the slip clutch and pinion bearing 18 allows the drive shaft to be driven by movement of the battery canister 3. Various slip-clutch mechanisms are available in the art. The preferred approach uses a pawl based ratchet mechanism as disclosed in Jimena, U.S. Pat. No. 4,315,301, column 5, line 38 to column 6, line 15, and the associated drawing, incorporated herein by this reference.

The battery canister 3 is rotatively and releasably mounted within the flashlight housing via a disengagable couplings 19a,19b so as to allow for its removal and battery replacement. The drive shaft 12 terminates at a rearward facing keyed spindle 20 rotatively supported by a rear bearing 21. The spindle is sized to engage a keyed axial hole 22 in a front pedestal 23 extending forward from the forward end 3a of the canister. In the preferred approach the spindle has a square cross-section for ease in manufacturing, strength and to provide adequate friction. This can be characterized as a variation in the radius of the spindle at different radial angles. A similar pedestal 24 for engaging a rear spindle 25 extends rearward from the back end 3b of the canister.

The battery canister 3 comprises a hollow, substantially cylindrical body separable along an axial medial portion into two matable halves 31,32 to allow for access to replace the batteries. In the preferred approach the ends of the halves are threaded 33. Holes may be placed through the canister ends 3a,3b to allow for easier extraction of batteries in hole-saw fashion.

The canister body is made from durable, thin, and slightly resilient material such as plastic. The inner chamber 29 of the canister is sized to accommodate two series connected D type 1.5V cells mounted end to end. It shall be apparent that different canister sizes and configurations may be designed to accommodate different numbers, shapes and sizes of batteries. Alternatively the device may be operated without batteries by placing cylindrical weights into the canister. If necessary, even a uniform granular solid or even fluid may be installed in the canister if tightly packed with minor modifications.

Proper balance of the loaded canister is important for both aesthetic, non-vibrational operation and flywheel efficiency. Therefore, the canister is sized to securely the position of the batteries. However, minor variations in the cylindrical uniformity of batteries due to manufacturing inconsistencies are tolerable. In the event substantially unbalanced or otherwise asymmetrical batteries are to be used, minor modification to the canister may be required such as counterweighting, to achieve a rotational balance.

In the preferred approach, means are provided for electrically connecting the batteries to the bulb. Indeed, when good batteries are installed, the generator need not be used and the device may operate as a normal flashlight.

Electrical connection of the batteries to the rest of the system occurs via a pair of generally washer shaped conductive plates 35,36 mounted to the front and back ends 3a,3b of the canister. The front plate 35 is mounted to the circular front end 3a about the front pedestal 23. A conductive attachment 37 runs through the circular front wall 38 of the canister to a conductive pad 39 contacting the front terminal of the front battery 27. The attachments can be conductive rivets which also serve to physically attach the plates to the canister walls. A similar plate and connection structure is located on the back end of the canister with the addition of an electrically conductive spring 40 extending forward from the rear canister wall to bias the batteries against the forward wall of the canister.

In a first embodiment, a conductive, resiliently rigid strip 50 terminating in a front end prong 51 and a back end prong 52 axially straddling the canister. The strip is therefore positioned to connect to or disconnect from the plates through movement of a thumb-switch 56 slidingly mounted to the housing. The strip has an open loop shape 53 near the front end prong 51 which allows a section 54 proximate to the front end to bear against a forward bulkhead 55 in the housing, facing the canister.

The strip is shown in the circuit open position with the thumb switch in its back position. The strip is moved into the circuit closed position by sliding the thumb-switch forward. This causes the loop to be further pressed against the bulkhead forcing the front end prong 51 rearward to contact the front plate 35, and the rear end prong 52 to contact the back conductive plate 36.

Although the above approach provides for the least amount of friction on the movement of the canister, some functionality is reduced. In an alternate approach, the canister may be continuously electrically connected via brushes made from low friction materials such as carbon. This allows for circuit based switching between generator and battery powered operation, and allows for recharging of the battery. Those skilled in the art of circuit design will appreciate what is required to so distribute the power produced by the generator.

Various means for manually imparting kinetic energy into the device have been proposed. Most can be easily adapted to the invention by those skilled in the art. However, the preferred mechanism is a gear-based hand lever structure which is enclosed or otherwise covered to protect the hands of the user from pinching.

Figure 4:
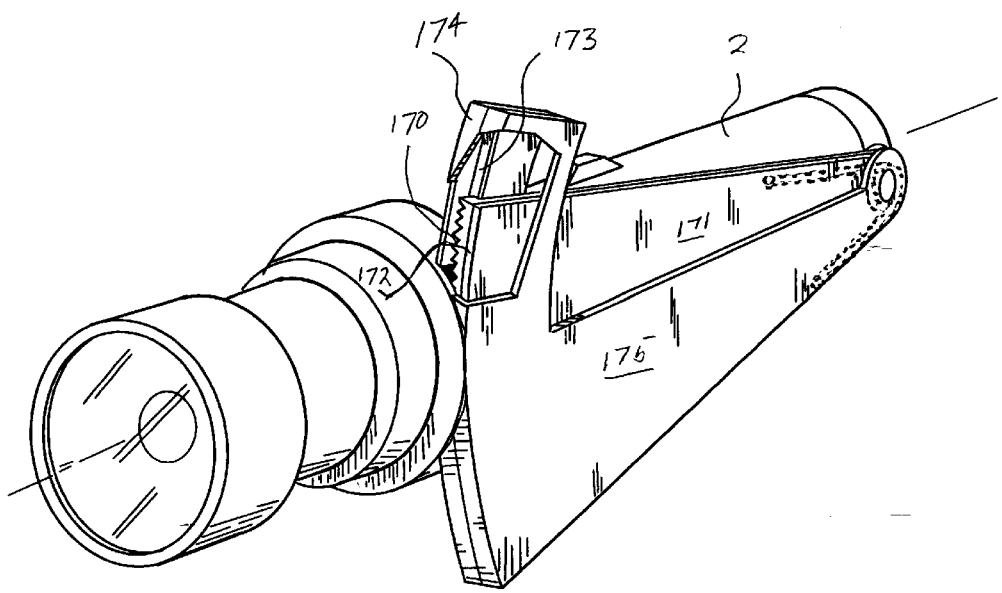
FIG. 4 is a diagrammatic, partial cutaway, perspective view of a first embodiment of the manual input means feature of the invention.

As shown in FIG. 4 the first approach involves an arched rack 170 formed at the end of a substantially wedge shaped hollow handle 171. The handle is rotatively mounted to the side of the flashlight housing 2 at its back end. The handle is slidingly supported at its front end 172 in an arched track 173 formed into the internal front end 174 of a hollow wedge shaped receptacle 175 mounted to the side of the flashlight housing 2. The receptacle serves as a covering for the rack gear to minimize injury. Both the hollow handle 171 and hollow receptacle 175 are formed by two lateral halves 171a,171b, and 175a,175b respectively which allow for an internal V-spring 176 which biases the handle and rack toward an upper position. In FIG. 4 the handle is shown midway between its upper and lower extent. This enclosed structural arrangement increases safety and helps prevent dirt and dust from entering the mechanisms.

The shape and orientation of the teeth on the arched rack must be selected to properly mesh with the teeth on the pinion gear. Due to the curved nature of the arched rack, care must be taken to provide unimpeded intermesh. It is well known in the mechanical arts to arrange the gear teeth at an angle as dictated by the radius of curvature of the arched rack.

It should be noted that gear ratios may be adjusted to provide a more comfortable resistance to the manual input. In addition stepping gearing or other rotational matching means may be added between the flywheel assembly and the generator shaft so that the generator operates more within its optimum operating range and the kinetic drain on the flywheel is more uniform.

Figure 5:
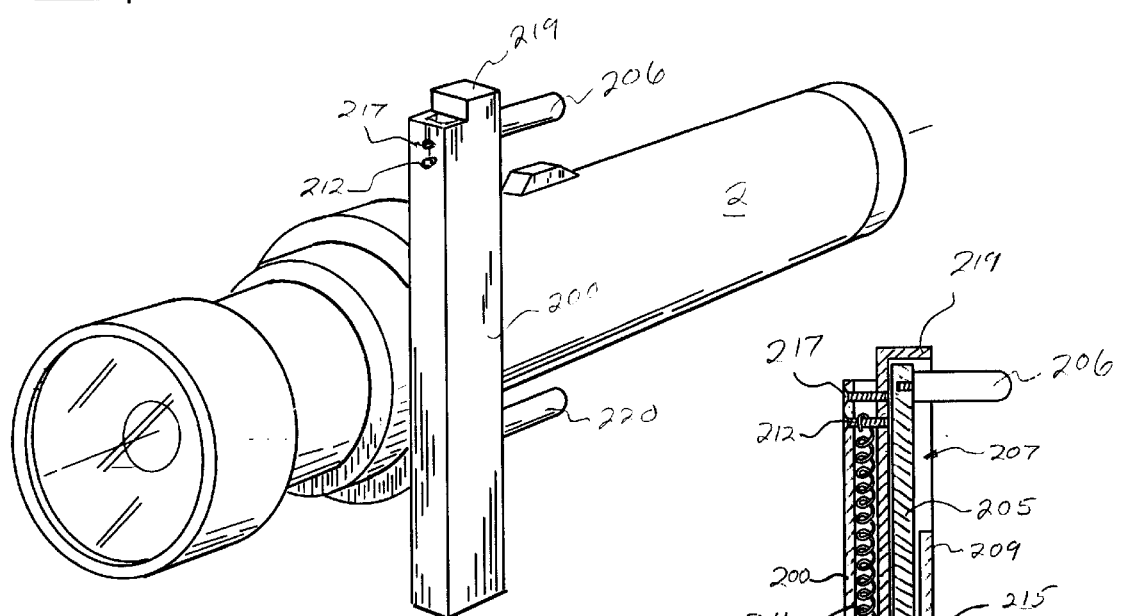
FIG. 5 is a diagrammatic, perspective view of a second embodiment of the manual input means feature of the invention.
Figure 6:
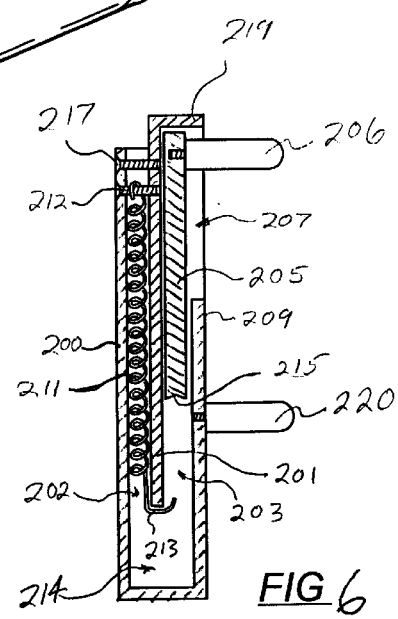
FIG. 6 is a cross-sectional side view of the manual input means of FIG. 4.

Another embodiment of the manual input means shown in FIG. 5 comprises an oblong quadrangular shaft 200 mounted substantially vertically against a side of the flashlight housing 2 near the location of the pinion gear. The shaft is hollow having a pair of parallel vertical channels 202,203 separated by a central vertical wall 201. The posterior channel 203 is sized to allow for the vertical movement of an elongated straight rack gear 205 slidingly mounted therein. This channel has a first lateral opening allowing communication between the rack and the drive pinion gear inside the flashlight. The channel also has a posterior vertical slot 207 along its upper posterior surface 209 through which extends an actuation button 206 attached to the top end of the rack.

The anterior channel 202 is sized for positioning a vertical spring 211 therein. The spring is attached at the top end of the channel by a pin 212. The bottom end of the spring terminates in a hook 213 which extends through a lower posterior slot 214 through the central wall 201. The hook connects to a bottom end 215 of the rack 205 thereby biasing it upward. The top ends of the channels are closed off either by a stop pin 217 as shown for the anterior channel, or a top wall 219 as shown for the posterior channel.

Depending on the overall size of the flashlight, people with larger hands will be able to manipulate the lever with one hand by depressing the button with one thumb. For those with smaller hands a second button 220 may be secured to a lower portion of the shaft.

Various other alternative approaches may be utilized for manually inputting energy without departing from the invention. Methods involving toothed or untoothed pull cords may be used as is disclosed in Jimena, U.S. Pat. No. 4,315,301 column 6, lines 16–52, and the associated drawing, incorporated herein by this reference.

Figure 7:
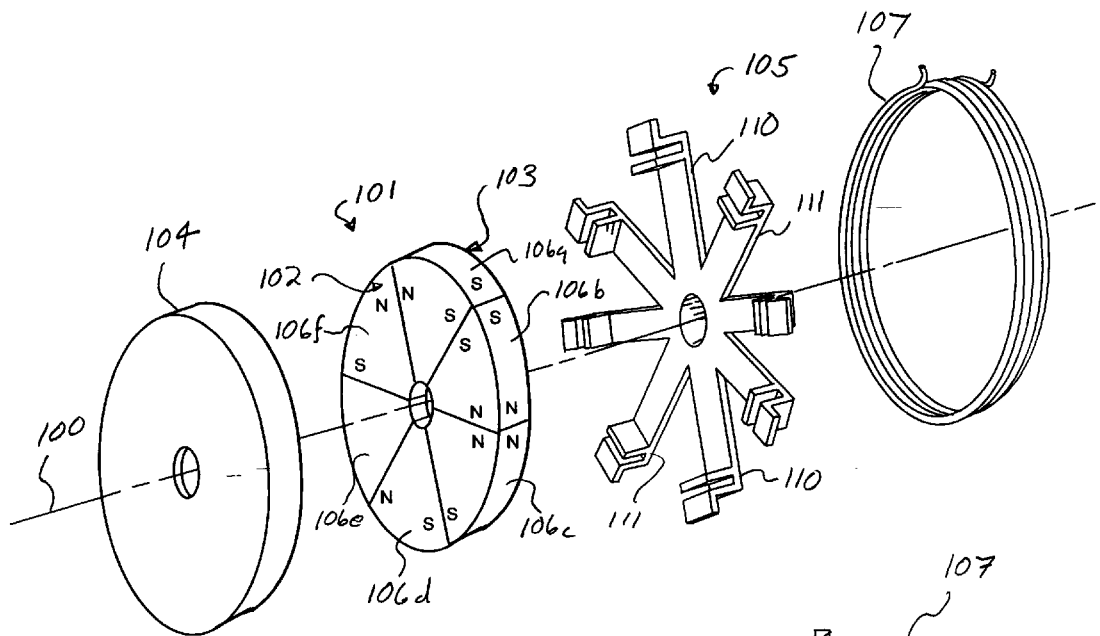
FIG. 7 is diagrammatic exploded perspective view of the major components of the high output electrical generator feature embodiment of the invention.
Figure 8:
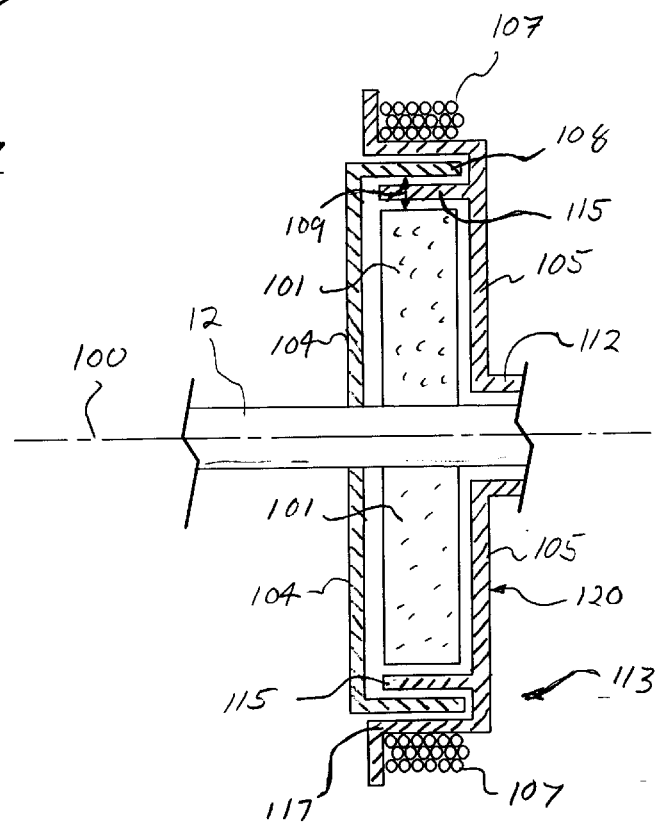
FIG. 8 is diagrammatic partially cross-sectional side view of an alternate embodiment of the high output generator feature of the invention.

Although the preferred embodiment uses an inexpensive, commonly available generator, in an alternate embodiment a specialized, high-output generator is disclosed. This generator is particularly indicated to improve battery recharge functionality. Referring now to FIGS. 7–8, there is shown the electrically functional portions of the high-output generator according to an additional embodiment of the invention.

The generator comprises a substantially disk-shaped magnet 101 oriented upon an axis 100, having substantially circular front and back sides 102,103, straddled by a magnet housing 104 on one side and coil support frame 105 for mounting a coil 107 on the other.

The magnetic charge is angularly divided in pie-piece fashion with respect to the axis into six magnetically distinct regions 106a–106f. Each angularly dipolar region is oriented so that it poles are opposite that of the angularly adjacent regions. For example, the North pole of region 106b is adjacent to the South pole of region 106c. In addition, this arrangement allows for consistent polarity between diametrically located regions. For example, the diametrically opposed portions of regions 106a and 106d have the same polarity.

Although six angular regions are shown, and six or eight regions are preferred, it is possible for the number of regions to equal two times any odd positive integer and still maintain this unique polarity arrangement. However, magnets with a high number of regions are likely to be structurally impractical. Although non-disc-shaped magnets may also be used, these are less preferred due to lower output for a given size.

The magnet 101 and the magnet housing 104 are both firmly mounted to the generator drive shaft 12 and thereby form the rotating armature of the generator. The housing has a circular flange 108 which extends out over the circular periphery of the magnet. The housing is sized to leave a gap 109 between the radially inner surface of the flange and the magnet. The housing is made from steel or other ferromagnetic materials which have the property of encouraging the densification of the magnetic flux emanating from the proximately located magnet.

The statically mounted frame 105 made from ferromagnetic materials such as steel, comprises a plurality of prong pairs 110,111 extending radially from opposite sides of an axial support cylinder 112. Toward the radially distal end 113 of each prong there is a flux-cutting extension 115 extending axially into the gap 109 between the magnet and housing. The extension is angularly arcuate so as to freely revolve about the magnet in the gap without touching the magnet or housing. More radially distal from the extension is a coil carrying seat 117 extending axially over the housing flange 108. The seat is shaped to carry, in combination with the other prongs, the coil 107 made from conductive material such as copper, in a position radially beyond the radial extent of the magnet. The axis of the coil windings are substantially in-line with the axis 100 of the magnet 101. The coil windings may also be extended to run in a spiral along the back surface 120 of the prongs. The center of the spiral lies substantially on the axis 100.

As the magnet and housing are rotated, the extensions disrupt the flux formed between each of the magnetic regions and the housing, thereby inducing current in the coil. The number of prongs on the frame is selected to provide a more regulated output, reducing the need for less efficient circuit device based signal conditioning.

The various structures must be mounted to allow for relative rotational movement between the frame and the magnet. However in the preferred embodiment, the magnet is rotatively mounted as an armature, while the coil structures are static. This allows a simpler bearing structure and is more easily manufactured in rotative balance. Also, the magnet will likely have greater mass than the frame, thereby enhancing mechanical energy storage by acting as a flywheel.

Although the frame in the above embodiment is shown having four prong pairs, the number of prongs may be adjusted without departing from the invention.

It is therefore clear that the overall weight of the device may be reduced over other flywheel based devices. Manufacturing costs are also reduced since high mass flywheels are unneeded. In addition, use of throw-away batteries is decreased.

Although the preferred embodiment describes the battery being used as part of the mass in a flywheel it is clear that the invention extends to the battery mass being used in other inertial systems such as pendulums, suspended weight mechanisms and other mass based mechanical energy storage mechanisms.

While the preferred embodiments of the invention have been described, modifications can be made and other embodiments may be devised without departing from the spirit of the invention and the scope of the appended claims.

What is claimed is:

1. An electrically powered apparatus comprises:
   a framework;
   an electrical power consuming element mounted to said framework;
   a battery;
   means for dynamically mounting said battery to said framework;
   means for converting movement of said battery with respect to said framework to electrically energize said element.

2. The apparatus of claim 1, wherein said means for converting comprise an electrical generator mounted to said framework.

3. The apparatus of claim 1, wherein said means for dynamically mounting comprise:
   a canister sized to contain said battery; and
   said canister rotatively mounted to said framework.

4. The apparatus of claim 2, which further comprises means for electronically wiring said battery to said element.

5. The apparatus of claim 4, wherein said means for electronically wiring comprise:
   first and second contact plates mounted on the outer surface of said canister, and in electrical contact with the positive and negative poles of said battery;
   an arcuate strip made from conductive resilient material having a first end portion positioned to contact said first plate, and a second end portion positioned to contact said second plate when said strip is in a closed position.

6. The apparatus of claim 2, which further comprises means for recharging said battery from an output of said generator.

7. The apparatus of claim 3, which further comprises means for manually imparting an amount of mechanical momentum on said canister, wherein said means for manually imparting comprise:
   a drive shaft releasably coupled to said canister; and
   manual means for spinning said shaft.

8. The apparatus of claim 7, wherein said means for spinning comprises:
   a pinion gear;
   means for temporarily coupling said pinion to said shaft;
   a rack gear meshing with said pinion;
   a movable handle coupled to said rack gear; and
   a covering over said rack gear.

9. The apparatus of claim 8, which further comprises means for biasing said handle toward a first position.

10. The apparatus of claim 2, wherein said generator comprises a substantially disk-shaped magnet oriented upon an axis, said magnet comprises:
    first and second angularly adjacent dipolar regions; and,
    wherein the North pole of said first region is proximate to the North pole of said second region.

11. The apparatus of claim 10, which further comprises a third dipolar region located diametrically opposite to said first region; wherein the North pole of said first region is diametrically opposite the South pole of said third region.

12. The apparatus of claim 10, wherein said generator further comprises a first coil structure rotatively mounted about a radial periphery of said magnet.

13. In a portable handheld electrically powered device comprising an electrical power consuming element energizable by a hand operable electric generator, an improvement comprises:
    a flywheel comprising an electrical storage cell.

14. A handheld portable electrically powered device comprises:
    a housing;
    an electrical power consuming element mounted to said housing;
    an electrical generator mounted to said housing;
    a battery dynamically mounted to said housing; and
    said battery mechanically driving said generator.

15. A handheld portable electrically powered device comprises:
    a housing;
    an electrical power consuming element mounted to said housing;
    an electrical generator mounted to said housing; and
    a mass-adjustable flywheel mechanically coupled to said generator;
    wherein said mass-adjustable flywheel comprises an openable canister rotatively mounted to said housing.

16. A method for powering a portable electrically powered device comprises:
    dynamically mounting a battery on said device;
    imparting said battery with an amount of mechanical momentum;
    transmitting said amount of mechanical momentum from said battery to an electrical generator; and
    electrically powering said device from said generator.

17. The method of claim 16, which further comprises securing said battery within a canister rotatively mounted within said device.

18. A flywheel which comprises an electrical storage cell.

19. The flywheel of claim 18, which further comprises means for facilitating electrically recharging said cell.

* * * * *